United States Patent [19]

Zannis

[11] Patent Number: 5,317,934
[45] Date of Patent: Jun. 7, 1994

[54] VARIABLE SPEED LINEAR ACTUATOR

[76] Inventor: Manuel S. Zannis, 4 Zaimi Street & Stournara, GR-106 83, Athens, Greece

[21] Appl. No.: 909,158

[22] Filed: Jul. 6, 1992

[30] Foreign Application Priority Data

Jul. 5, 1991 [GR] Greece ............................ 910100300

[51] Int. Cl.⁵ ............................................ F16H 21/32
[52] U.S. Cl. ........................................ 74/40; 74/44; 74/89.2; 49/340; 187/56
[58] Field of Search ................ 74/29, 40, 44, 45, 89, 74/89.2, 89.22; 49/340, 344, 360; 160/188; 187/56

[56] References Cited

U.S. PATENT DOCUMENTS

| 151,721 | 6/1874 | Shaw | 74/44 X |
| 534,600 | 2/1895 | Davis et al. | 74/40 |
| 1,414,650 | 5/1922 | Joslin | 74/29 |
| 1,989,964 | 2/1935 | Beckler | 74/89.22 |
| 2,027,275 | 1/1936 | Foster | 74/89.22 |
| 4,899,606 | 2/1990 | Harris | 74/29 |

Primary Examiner—Leslie A. Braun
Assistant Examiner—David W. Laub

[57] ABSTRACT

An apparatus that converts a rotary motion into linear motion through the use of a linkage system that has a pair of levers that are driven through a pulley arrangement. Wherein, the pair of levers and pulley arrangement are configured to produce a variable linear drive.

11 Claims, 2 Drawing Sheets

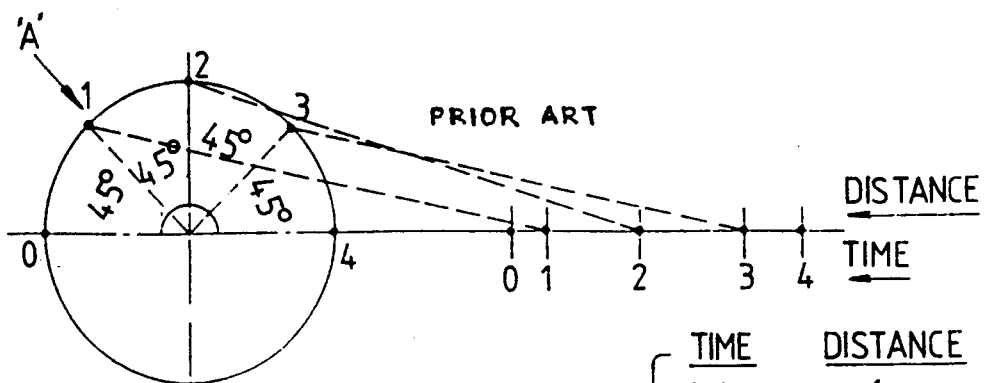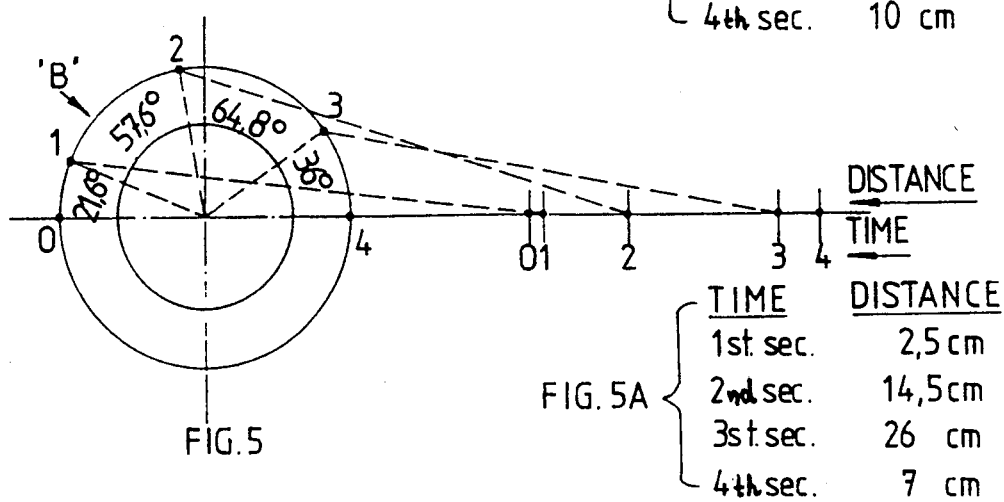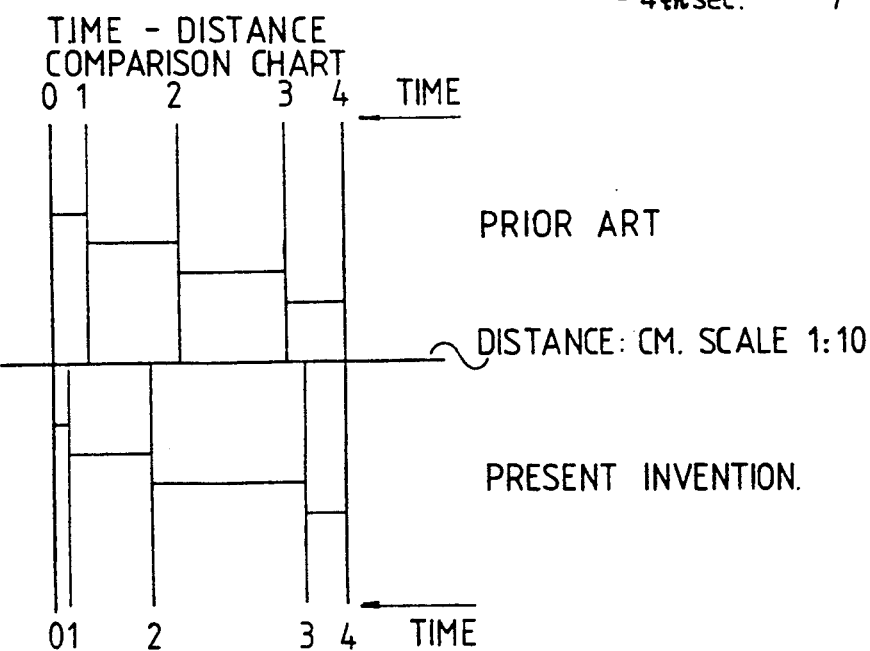

VARIABLE SPEED LINEAR ACTUATOR

BACKGROUND OF THE INVENTION

This invention relates to a variable speed linear actuator for use in a reciprocating system. Examples of such systems, but not limited thereto are automatic elevator doors; transit system train doors; shop doors; production machine tool work loading carriers; safety doors for protection of hands and fingers from injury on punch presses and other forms of dangerous equipment; and any other application that a controllable reciprocating movement is required.

SUMMARY OF THE INVENTION

The existing systems for providing a controllable reciprocating motion are many and varied. Some are directly linear in nature such as compressed air cylinders, while others are translatable from rotary to linear motion, by mechanical means actuated by electric motors, hydraulic systems and compressed air, as well as fancy electronic control systems.

Generally, the prior art involves rotary motion, i.e. a pulley which moves at a substantially steady angular speed by means of an electrical motor and belts or chains, that is translated by mechanical means, i.e. levers, etc., to a variable linear movement. While such linear movement is somewhat variable it produces a generally flat speed curve over its range of motion. It has been found that in the case of elevator doors the passengers on the elevator do not appreciate a door that moves at a generally constant rate of speed, but rather, prefer a door that starts slowly, quickly increases to a maximum rate of opening or closing, and terminates its travel in a somewhat slower manner, i.e., to permit operation of safety features at the terminal portion of travel, as are well known on such doors.

BRIEF DESCRIPTION OF THE DRAWINGS

FIG. 4 is a diagrammatic diagram showing the angular to linear movement of the prior art actuator system shown in FIG. 1;

FIG. 4A is a tabulation of the elapsed time and distance traveled by the prior art device shown in FIGS. 1 and 4;

FIG. 5 is a diagrammatic diagram showing the angular to linear movement of the present invention shown in FIGS. 2 and 3;

FIG. 5A is a tabulation of the elapsed time and distance traveled by the present invention shown in FIGS. 2 and 3; and FIG. 6 is a block diagram comparing the prior art device time-distance movement along the upper edge of a horizontal line defining a predetermined distance, and the amount of time-distance movement along the lower edge of the same horizontal line by the present invention, the numbered vertical lines defining elapsed time of the operation of the motive source.

DESCRIPTION OF THE PREFERRED EMBODIMENTS

Figure 1:
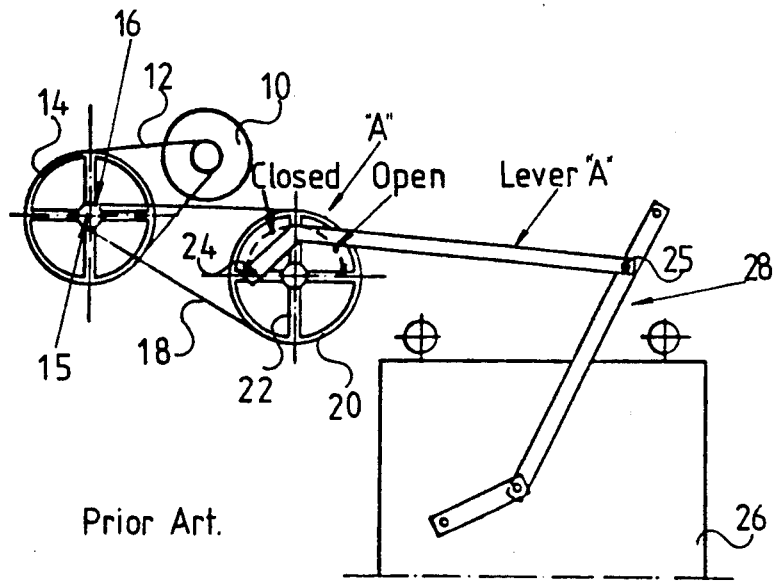
FIG. 1 is schematic elevational view of a prior art rectilinear actuator system.

Referring now to the drawing wherein similar parts are designated by similar numerals, and particularly FIG. 1, a constant speed reversible motor 10 is connected by belt 12 to a drive pulley 14 mounted on a common shaft 15 which also carries a small sheave 16. Sheave 16 carries a belt 18 connected to the outer rim 20 of pulley "A". Pulley "A" has one or more spokes 22, one of said spokes carrying a pivot 24 operatively connected to crank or lever "A", which is operatively connected at its opposite end 25 to the operating mechanism 28 for an elevator door 26.

The motor 10 can be either a constant speed stepping motor having adequate strength and numbered revolutions to enable the pulley "A" to rotate 180 degrees between open and closed positions along the dotted line of angular travel, or, alternatively, a constant speed reversible motor 10 is provided with slip clutch means, not shown, to permit the pulley "A" to angularly move 180 degrees between stop means.

As can be best seen in FIG. 4, a constant speed reversible motor will move the pulley "A" through four equal arcs of travel at a constant angular speed, with each segment being identified by a number from 0 through 4, such numbers being representative of the elapsed time parameter for the operation of motor 10. The lever "A", however, will move rectilinearly in a variable linear speed, as shown by the variation in spacing along the distance line in FIG. 4 (identified by the elapsed time numbers on the pulley "A").

Thus, the known or prior art involves the use of a pulley "A" having a constant rate of angular speed while the crank or lever "A" moves at a variable rate of linear speed, as set forth in the table shown in FIG. 4A.

Figure 2:
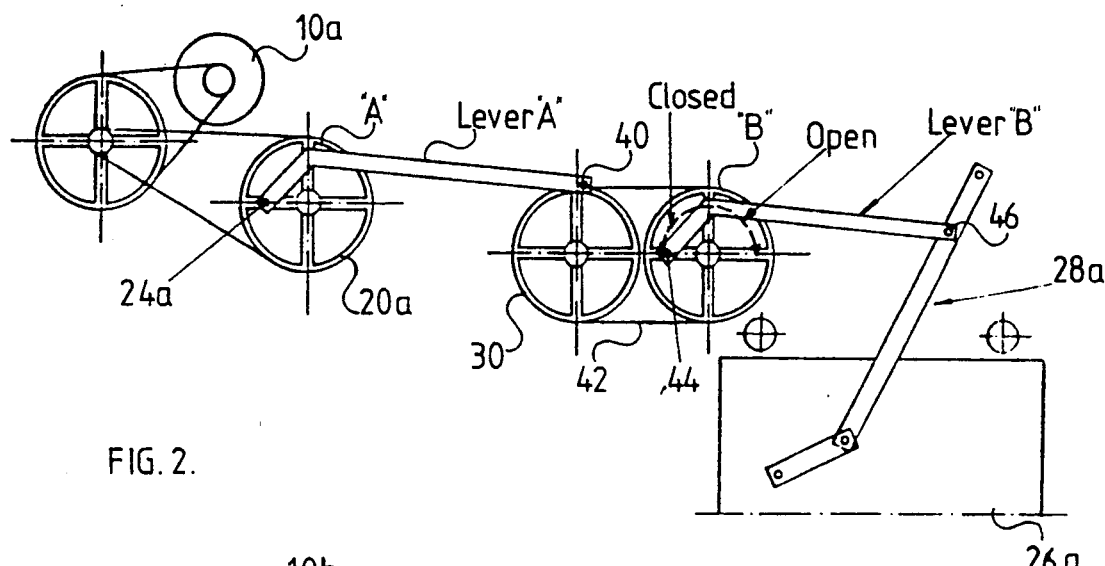
FIG. 2 is a schematic elevational view of a first embodiment of the present invention.

Referring now to FIGS. 2, 5 and 5A; a preferred embodiment of the present invention, wherein similar parts are identified by similar numerals with the addition of the suffix "a". It utilizes the aforementioned example of the prior art wherein the variable rate of speed lever "A" is connected to a second pulley 30 having pivot means 40 for operatively accepting the opposite lever end 40 from the driven end 24a. As pulley 30 is driven at a variable angular rate of speed, the belt or chain drive 42 moves the pulley "B" at an identical variable rate speed. A crank or lever "B" is connected by appropriate means such as pivot 44 connected to a spoke or disk of the pulley "B" and moved variable distances within the time parameters previously shown in FIG. 4. In the preferred embodiments the lever "B" is connected at its opposite end 46 to the operating means 28a for the elevator door 26a and moves at a variable rate of speed for distance covered and as shown in FIG. 5, as tabulated in FIG. 5A. Thus, during the movement between zero and one (in the time parameters) pulley "B" will rotate 21.6 degrees, from one to two it will rotate 57.6 degrees, from two to three it will rotate 64.8 degrees and in the final movement from three to four it will move 36 degrees. This variable angular speed results, when translated by the moving lever "B", in a variable linear speed of the magnitude tabulated in FIG. 5A.

In FIG. 6 a time-distance comparison chart, the numbered vertical lines, above the horizontal line, being the elapsed times set forth in FIG. 4A, while the numbered vertical lines below the horizontal line being the elapsed times set forth in FIG. 5A. The horizontal movement of the doors 26a would be greatly improved due to the increase of the relationship between maximum and minimum movement. The presence of a period of minimum movement at either end of the movement is a necessity to prevent banging of the doors and impact on the machinery, however, by having a longer movement at maximum speed, as shown between numbers 1 and 3, in FIGS. 5 and 5A.

Figure 3:
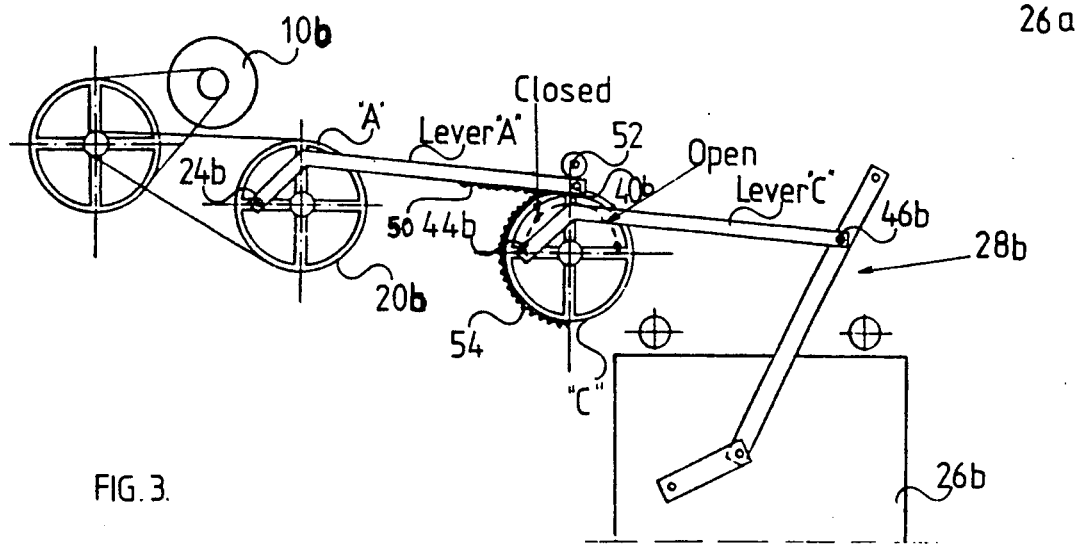
FIG. 3 is a schematic elevational view of another embodiment of the present invention.

A further embodiment is shown in FIG. 3, wherein similar numerals are utilized with the addition of the suffix "b". In this embodiment the lever "A" is connected at its power end 24b to pivot means, as was done in the previous embodiment, however, in this embodiment the opposite end is operatively connected to pulley "C" at pivot 40b. The lever "A" includes a toothed rack means 50 mounted on its underside for engagement with a segmental gear means 54 carried on the outer perimeter of pulley "C". An idler pulley 52 insures active contact between rack means 50 and gear means 54. The variable angular rate of speed of pulley "C" developed by the variable linear speed of lever "A" results in an accentuated variable linear speed in lever "C" of the same magnitude as that developed in lever "B", above. Basically, the movement shown in FIG. 5 and charted in FIG. 5A. the force and speed developed by lever "C" are substantially identical to those of lever "B". The major advantage of pulley "C" is the positive drive of the rack means 50 on gear means 54, as opposed to the belt drive of the first embodiment.

The advantages of the present invention are apparent when the block time-distance comparison chart is studied. The type of motive power can be of any type that will generate a constant angular rate of speed in the first pulley and the power can be electrical, hydraulic, pistons and crank shafts, or any other combination. Similarly, the diameter of the pulleys, the lengths of levers and operating apparatus for the doors can be elected to fit the circumstances confronted by the designer.

Other variations will be apparent to those skilled in the art and should be included herein when the claims are read in conjunction with the above specification.

I claim:

1. A means for translation of constant speed rotary motion to variable speed linear motion, including power motive means for driving a first circular means at a constant speed, a lever means having a first end pivotally mounted on said circular means and the opposite end of said lever means being moved at a variable rate of linear speed when said first end is moved through segments of a circular path by said circular means, a means for pivotally accepting and connecting to said lever means at its opposite end, said last mentioned pivotable means connecting to second rotatable circular means to said opposite end of said lever and thereby developing a variable rate of angular speed in said second rotatable circular means when said first circular means is rotated, and a second lever means connected to said second circular means and translating said variable rate of angular speed to segments of linear motion having determinable variable linear rates of speed, with each segment having a substantially large diversity between said determinable developed maximum and minimum speeds of said segments.

2. A translation means as claimed in claim 1 wherein said means for connecting said opposite end of said first mentioned lever is a pulley connected by suitable means to said second circular means.

3. A translation means as claimed in claim 2 wherein said means for connecting is a flexible endless means.

4. A translation means as claimed in claim 3 wherein said flexible means is a belt.

5. A translation means as claimed in claim 2 wherein said flexible means is an endless chain link means and said pulley and said second circular means include positive means for accepting and engaging said chain link means.

6. A translation means as claimed in claim 2 wherein said first mentioned lever at said opposite end carries rack means, said second rotatable circular means including a convex gear segment engageable with said rack means, whereby said circular means is positively driven at a variable rate of speed.

7. A translation means as claimed in claim 6 wherein an idler pulley is provided to rest atop said first mentioned lever to ensure engagement between said rack and said gear segment.

8. A translation means system including a reversible powered constant angular speed first rotary motion means, first lever means connected at one end to said rotary motion means at a point radially spaced outwardly from the axis of said rotary motion means, the opposite end of said first lever means developing a variable linear speed when said first rotary motion means rotates, a second rotary motion means, said opposite end of said first lever means being operatively connected to said second rotary motion means and capable of effectively producing variable angular rates of speed in said second rotary motion means, and a second lever means being operatively connected at one of its ends to said second rotary motion means outboard of the axis thereof whereby angular movement through segments of rotation of said second rotary motion means produces a greatly enhanced differential between maximum and minimum variable linear speeds produced by movement through said various segments, within similar time parameters, when a comparison is made between said second lever means and said first mentioned lever means.

9. A translation means as claimed in claim 8 wherein said translation means is connected to the operating mechanism of an elevator's doors.

10. A translation means as claimed in claim 9 wherein said translation means restricts the beginning and ending segments producing said minimum variable linear speed to less than 20% of the total time parameter of the system operating time.

11. A translation means as claimed in claim 9 wherein said translation means utilizes the mid-range segments having said maximum variable linear speed for a period greater than 80% of the total time parameter of the system operating time.

* * * * *